United States Patent
Rao et al.

(10) Patent No.: US 7,657,336 B2
(45) Date of Patent: Feb. 2, 2010

(54) REDUCTION OF MEMORY REQUIREMENTS BY DE-INTERLEAVING AUDIO SAMPLES WITH TWO BUFFERS

(75) Inventors: Arun Rao, Bangalore (IN); Sunoj Koshy, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1086 days.

(21) Appl. No.: 10/717,418

(22) Filed: Nov. 19, 2003

(65) Prior Publication Data

US 2005/0096765 A1   May 5, 2005

Related U.S. Application Data

(60) Provisional application No. 60/516,195, filed on Oct. 31, 2003.

(51) Int. Cl.
*G06F 17/00* (2006.01)
(52) U.S. Cl. ........................................................ 700/94
(58) Field of Classification Search ................... 700/94; 386/125, 126
See application file for complete search history.

(56) References Cited

U.S. PATENT DOCUMENTS

| | | | |
|---|---|---|---|
| 6,820,091 B2 * | 11/2004 | Weigelt | 707/102 |
| 2001/0041062 A1 * | 11/2001 | Ottesen et al. | 386/125 |
| 2003/0221014 A1 * | 11/2003 | Kosiba et al. | 709/231 |

* cited by examiner

*Primary Examiner*—Andrew C Flanders
(74) *Attorney, Agent, or Firm*—McAndrews, Held & Malloy, Ltd.

(57) ABSTRACT

Presented herein is a method and system for reducing memory requirements in audio signal processing by de-interleaving audio information with at least two static buffers and a dynamic buffer. The method may include writing interleaved audio information to a first static memory device. The method may also include de-interleaving the audio information and writing de-interleaved audio information to a second static memory device. The method may also include writing de-interleaved audio information to a dynamic memory device from the second static memory device and overwriting interleaved audio information with new interleaved audio information in the first static memory device. The method may also include overwriting interleaved audio information in the first static memory device with de-interleaved audio information from the dynamic memory device and decoding the audio information.

14 Claims, 6 Drawing Sheets

REDUCTION OF MEMORY REQUIREMENTS BY DE-INTERLEAVING AUDIO SAMPLES WITH TWO BUFFERS

CROSS-REFERENCE TO RELATED APPLICATIONS/INCORPORATION BY REFERENCE

The present application claims the benefit of U.S. Provisional Application No. 60/516,195 entitled REDUCTION OF MEMORY REQUIREMENTS BY DE-INTERLEAVING AUDIO SAMPLES WITH TWO BUFFERS filed on Oct. 31, 2003, the complete subject matter of which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Pursuant to the MPEG-2 Advanced Audio Coding (MPEG-2 AAC) standard, audio signals are sampled at 48K samples/second. The samples are grouped into consecutive frames of 1024 samples. Windowing is applied on a block of audio samples. The block length "N" could be either 2048 or 256 samples. However, each window has a 50% overlap with the previous window.

Accordingly, the first N/2 samples of a window are the same as the last N/2 samples of the previous window. A window function is applied to each window, resulting in sets of 2048 or 256 windowed samples. A modified discrete cosine transformation is applied to each set of windowed samples, resulting in N/2 frequency coefficients. The frequency coefficients are then quantized and coded for transmission.

The first step in decoding is to establish the frame synchronization. Once the frame synchronization is found, the AAC bitstream can be decoded to generate audio time domain samples. The decoding process includes Huffman decoding, scale factor decoding, and decoding of side information used in tools such as Mid/Side (M/S), intensity stereo, TNS, and filter bank. The spectral samples are decoded and copied to the output buffer in a sampled fashion.

After Huffman decoding, for example, each coefficient may be inverse quantized by a 4/3 power nonlinearity and then scaled by the quantizer step size. Finally, the Inverse MDCT (IMDCT) transforms the spectral coefficients into time domain. After the IMDCT transform, the output samples may be windowed, overlapped, and added for generating the final pulse code modulate (PCM) samples.

Further limitations and disadvantages of conventional and traditional systems will become apparent to one of skill in the art through comparison of such systems with the invention as set forth in the remainder of the present application and with reference to the drawings appended hereto.

BRIEF SUMMARY OF THE INVENTION

Aspects of the present invention may be found in a method of reducing memory requirements by de-interleaving audio information with static and dynamic buffers. The method may comprise writing interleaved first audio channel information to a first static memory device, de-interleaving the first audio channel information, and writing de-interleaved first audio channel information to a second static memory device.

The method may also comprise writing de-interleaved first audio channel information to a dynamic memory device from the second static memory device, overwriting interleaved first audio channel information with interleaved second audio channel information in the first static memory device, de-interleaving second audio channel information, and writing de-interleaved second audio channel information to a second static memory device.

The method may also comprise overwriting interleaved second audio channel information in the first static memory with de-interleaved first audio channel information from the dynamic memory device and decoding the first and second audio channel information.

In another embodiment of the present invention, the first audio channel information and the second audio channel information may comprise interleaving, wherein interleaving may comprise associating similar audio information from adjacent frames.

In another embodiment of the present invention, similar audio information may comprise audio information corresponding to a particular range of audio frequencies.

Another embodiment of the present invention may comprise maintaining audio quality of transmitted audio information by receiving the audio information in an interleaved state.

Aspects of the present invention may also be found in a system for de-interleaving audio information with static and dynamic buffers. The system may comprise a first static memory device, a de-interleaving engine, a second static memory device, a dynamic memory device, and an audio decoder. The interleaved first audio channel information may be written into the first static memory device, de-interleaved by the de-interleaving engine, written into the second static memory device, and temporarily stored in the dynamic memory device.

In another embodiment of the present invention, the interleaved first audio channel information may be overwritten in the first static memory by interleaved second audio channel information. The interleaved second audio channel information may be de-interleaved by the de-interleaving engine. The de-interleaved second audio channel information may be written to the second static memory device.

In another embodiment of the present invention, interleaved second audio channel information in the first static memory may be overwritten by the de-interleaved first audio channel information from the dynamic memory device.

In another embodiment of the present invention, the de-interleaved first and second audio channel information may be decoded by the audio decoder.

In another embodiment of the present invention, interleaved audio information may comprise similar audio information from adjacent frames being associated in adjacent sub-frames.

In another embodiment of the present invention, similar audio information may comprise audio information corresponding to a particular range of audio frequencies.

In another embodiment of the present invention, audio quality of transmitted audio information may be maintained by receiving the audio information in an interleaved state.

Aspects of the present invention may also be found in an application specific integrated circuit (ASIC) for de-interleaving audio information. The circuit may comprise a first static memory device operatively connected to a de-interleaving engine, a second static memory device also operatively connected to the de-interleaving engine, a dynamic memory device operatively connected to the first and second static memory devices, and an audio decoder operatively connected to the first and second static memory devices. The interleaved first audio channel information may be written into the first static memory device, de-interleaved by the de-interleaving engine, written into the second static memory device, and temporarily stored in the dynamic memory device.

In another embodiment of the present invention, the interleaved first audio channel information may be overwritten in the first static memory by interleaved second audio channel information, the interleaved second audio channel information may be de-interleaved by the de-interleaving engine, and the de-interleaved second audio channel information may be written to the second static memory device.

In another embodiment of the present invention, the interleaved second audio channel information in the first static memory may be overwritten by the de-interleaved first audio channel information from the dynamic memory device.

In another embodiment of the present invention, the de-interleaved first and second audio channel information may be decoded by the audio decoder.

In another embodiment of the present invention, interleaved audio information may comprise similar audio information from adjacent frames being associated in adjacent sub-frames.

In another embodiment of the present invention, similar audio information may comprise audio information corresponding to a particular range of audio frequencies.

In another embodiment of the present invention, audio quality of transmitted audio information may be maintained by receiving the audio information in an interleaved state.

These and other advantages and novel features of the present invention, as well as details of an illustrated embodiment thereof, will be more fully understood from the following description and drawings.

DETAILED DESCRIPTION OF THE INVENTION

Figure 1:
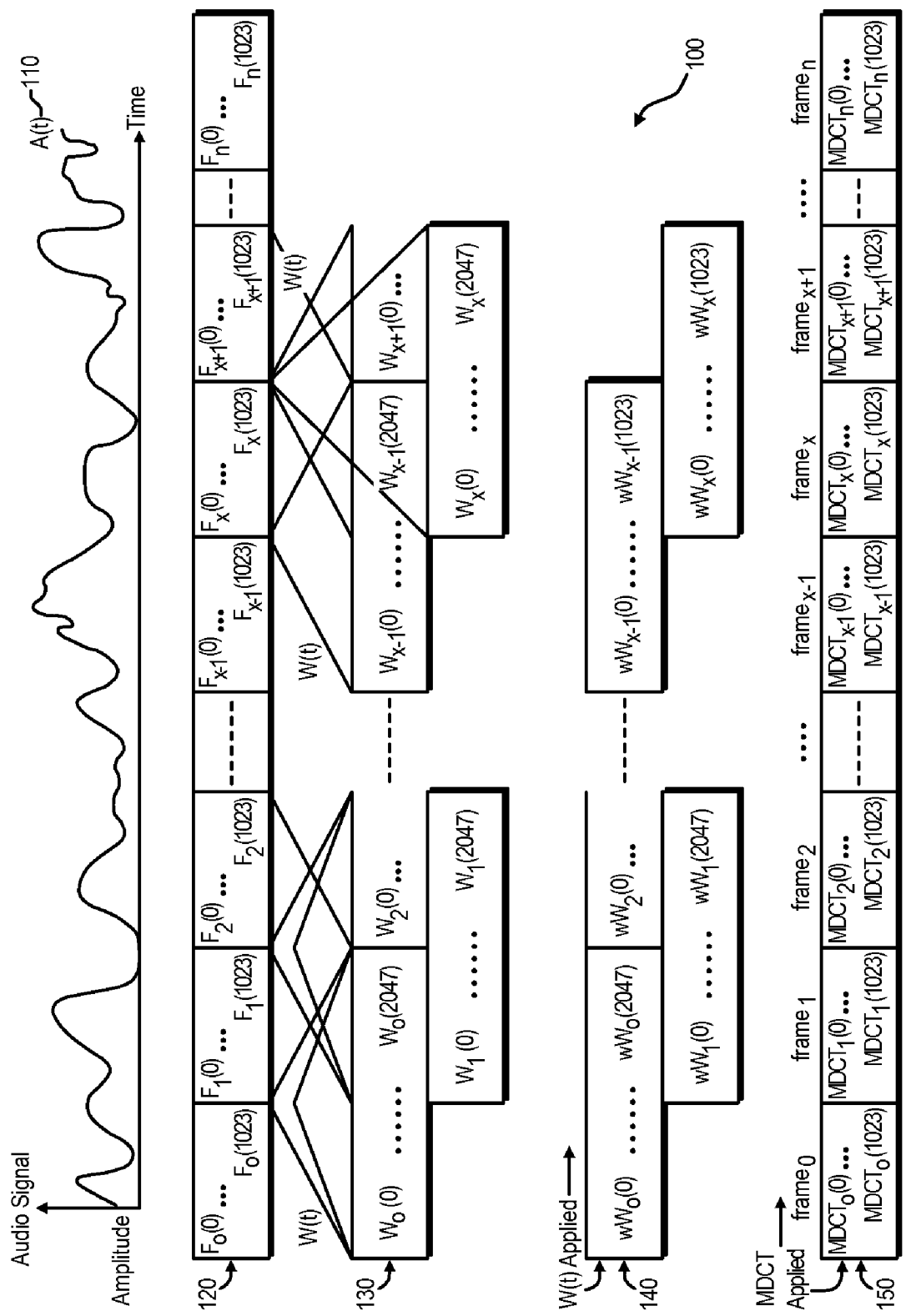
FIG. 1 is a block diagram describing encoding of an audio signal according to an embodiment of the present invention.

Referring now to FIG. 1, there is illustrated a block diagram 100 describing the encoding of an exemplary audio signal A(t) 110 according to an embodiment of the present invention. Pursuant to the MPEG-2 Advanced Audio Coding (MPEG-2 AAC) standard, the audio signal 110 may be sampled at 48K samples/second. The samples may be grouped into frames $F_0 \ldots F_n$ of 1024 samples 120, e.g., $F_x(0) \ldots F_x(1023)$. Windowing may be applied on a block of audio samples 130. The block length "N" could be either 2048 or 256 samples.

Each window $W_x$ may have a 50% overlap with the previous window $W_{x-1}$. Accordingly, the first N/2 samples of a window $W_x$ may be the same as the last N/2 samples of the previous window $W_{x-1}$. A window function w(t) may be applied to each window $W_0 \ldots W_n$, resulting in sets $wW_0 \ldots wW_n$ of 2048 windowed samples 140, e.g., $wW_x(0) \ldots wW_x(2047)$. For example, for a short block having 256 samples, windowing may be applied for each of the 256 samples, resulting in 2048 samples, after windowing.

A modified discrete cosine transformation (MDCT) may be applied to each set $wW_0 \ldots wW_n$ of windowed samples $wW_x(0) \ldots wW_x(2047)$, resulting in sets $MDCT_0 \ldots MDCT_n$ of 1024 frequency coefficients 150, e.g., $MDCT_x(0) \ldots MDCT_x(1023)$.

The sets of frequency coefficients $MDCT_0 \ldots MDCT_n$ may be quantized and coded for transmission, forming what is known as an audio elementary stream (AES). The AES may be packetized and padded with extra headers to form an Audio Transport Stream (Audio TS). Transport streams may be multiplexed together, stored, and/or transported for playback on a playback device.

The playback device may either be locally or remotely located. Where the playback device is remotely located, the multiplexed stream may be transported over a communication medium, such as the Internet. During playback, the multiplexed transport stream may be de-multiplexed, resulting in individual Audio Transport Streams. The Audio TS may be stripped of the additional headers. The constituent AES's may be decoded, resulting in the audio signal.

Figure 1A:
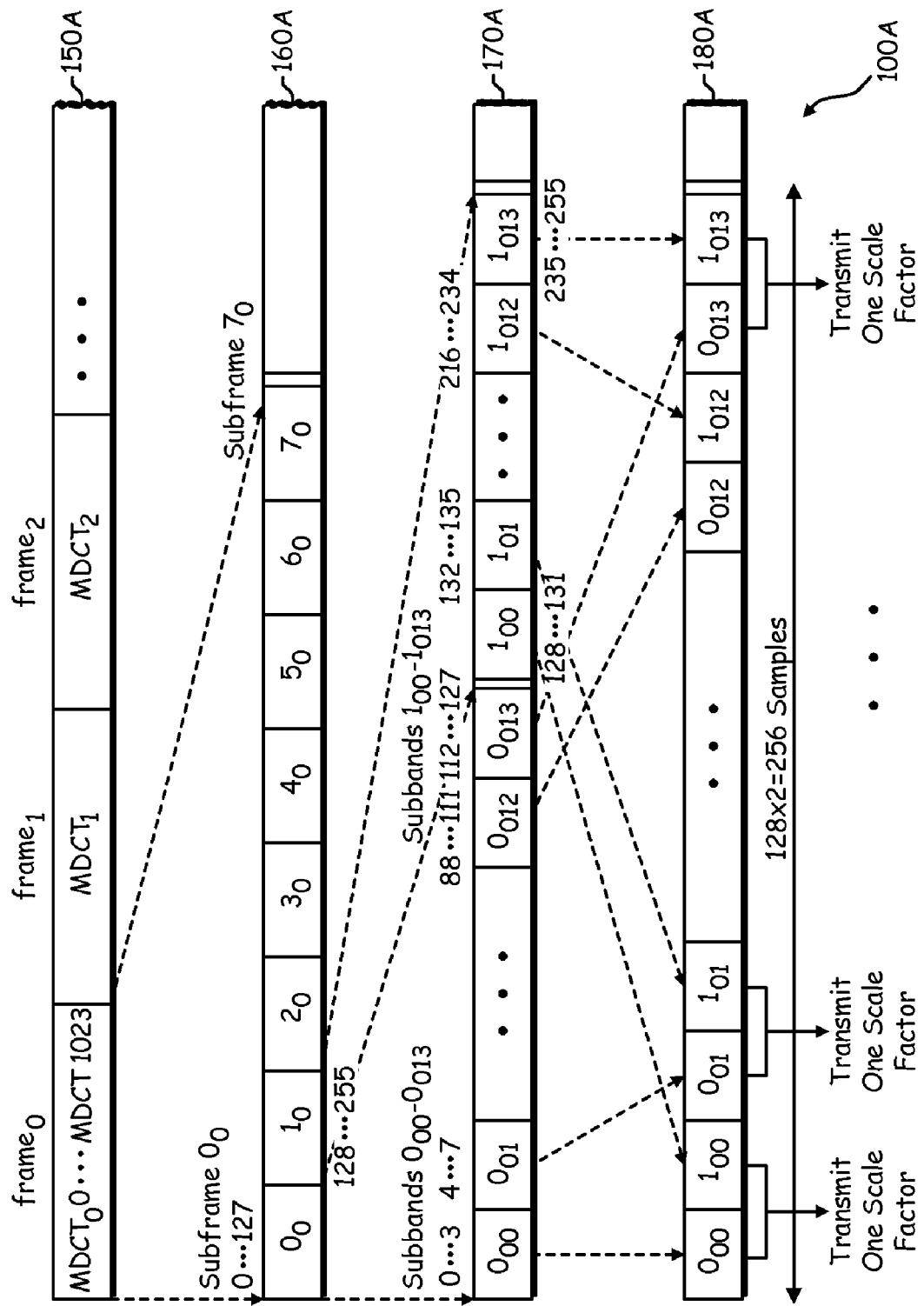
FIG. 1A is a block diagram describing interleaving of an encoded audio signal according to an embodiment of the present invention.

FIG. 1A is a block diagram 100A describing interleaving of an encoded audio signal according to an embodiment of the present invention. The frequency coefficients $MDCT_0 \ldots MDCT_n$ 150A may be interleaved. In an audio translatable signal, each frame may comprise frequency coefficients $MDCT_0 \ldots MDCT_{1023}$ which may be further divided into a plurality of equal sub-frames 160A, for example, 8 sub-frames, wherein each sub-frame may have 128 frequency coefficients contained therein. Sub-frame contents may correspond to a particular range of audio frequencies.

For example, $frame_0$ may comprise 8 sub-frames organized as follows: sub-frame $0_0$ may contain frequency coefficients 0 through 127, sub-frame $1_0$ may contain frequency coefficients 128 through 255, . . . , and sub-frame $7_0$ may contain frequency coefficients 896 through 1023.

Likewise, the next frame, $frame_1$ may also comprise 8 sub-frames organized as follows: sub-frame $0_1$ may contain frequency coefficients 0 through 127, sub-frame $1_1$ may contain frequency coefficients 128 through 255, and sub-frame $7_1$ may contain frequency coefficients 896 through 1023.

The frames may be divided into sub-frames based upon the block type of that particular frame. In the case of an AAC algorithm, for a short block type, the frame may be divided into 8 sub frames. Each of these sub-frames may further comprise sub-bands 170A. Each of these sub-bands may comprise a variable number of frequency coefficients. For example, sub-frame $0_0$ may comprise 14 sub-bands organized as follows: sub-band $0_{00}$ may contain frequency coefficients 0 through 3, sub-band $0_{01}$ may contain frequency coefficients 4 through 7, . . . , and sub-band $0_{013}$ may contain frequency coefficients 112 through 127.

Interleaving may comprise a re-associating of sub-bands containing similar audio translatable frequencies. For example, each of the sub-bands of sub-frame $0_0$ may be associated adjacent to the corresponding sub-bands of sub-frame 1₀ 180. Interleaving the samples decreases the effective number of bits required to be transmitted, because a single set of scale factors may be transmitted for the set of frequency coefficients formed by the association of all of the sub-bands in adjacent sub-frames. The number of sub-frames that may be associated together may also vary in a frame. For example, in FIG. 1A, two sub-frames have been associated (grouped) together.

Interleaving of audio samples promotes sound quality by associating similar audio translatable frequencies across sub-frames in a frame. The number of bits required to be transmitted to recreate audio time samples may be reduced.

Figure 2:
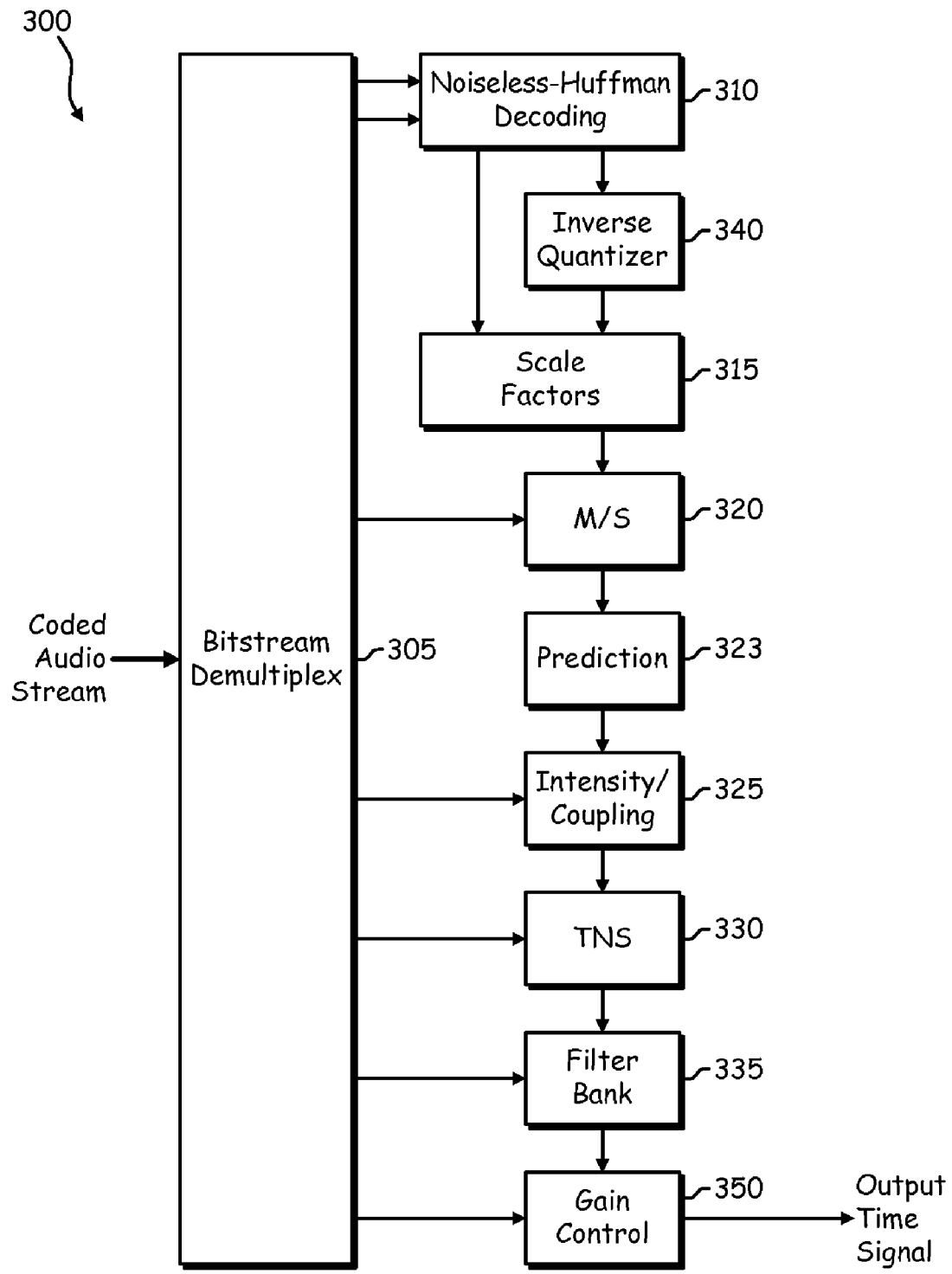
FIG. 2 is a block diagram of an exemplary AAC decoder in accordance with an embodiment of the present invention.

Referring now to FIG. 2, there is illustrated a block diagram describing an exemplary AAC decoder 300 in accordance with an embodiment of the present invention. Once the frame synchronization is found, the AAC bitstream may be de-multiplexed by a bitstream de-multiplexer 305.

This may include Huffman decoding 310, scale factor decoding 315, and decoding of side information used in tools, such as, Mid/Side decoding (M/S) 320, prediction decoding 323, intensity stereo 325, TNS 330, and filter bank 335. The sub-frames containing audio translatable frequency coefficients may be decoded and copied to an output buffer.

After Huffman decoding 310, an inverse quantizer 340 may inverse quantize each sub-frame of audio translatable frequency coefficients by a 4/3 power nonlinearity. The scale factors 315 may then be used to scale sets of frequency coefficients $MDCT_0 \ldots MDCT_n$ by the quantizer step size.

Additionally, tools including the M/S decoding 320, intensity stereo 325, TNS 330, and the filter bank 335 may apply further functions to the sets of frequency coefficients $MDCT_0 \ldots MDCT_n$. Finally, the gain control 350 may transform the frequency coefficients $MDCT_0 \ldots MDCT_n$ into the time domain signal A(t). The gain control 350 may transform the frequency coefficients by application of the Inverse MDCT (IMDCT), the inverse window function, window overlap, and window adding. The audio signal may be transmitted to a remote device for playback or stored for later playback. When playback is desired, the audio signal may be de-multiplexed and decoded.

Figure 3:
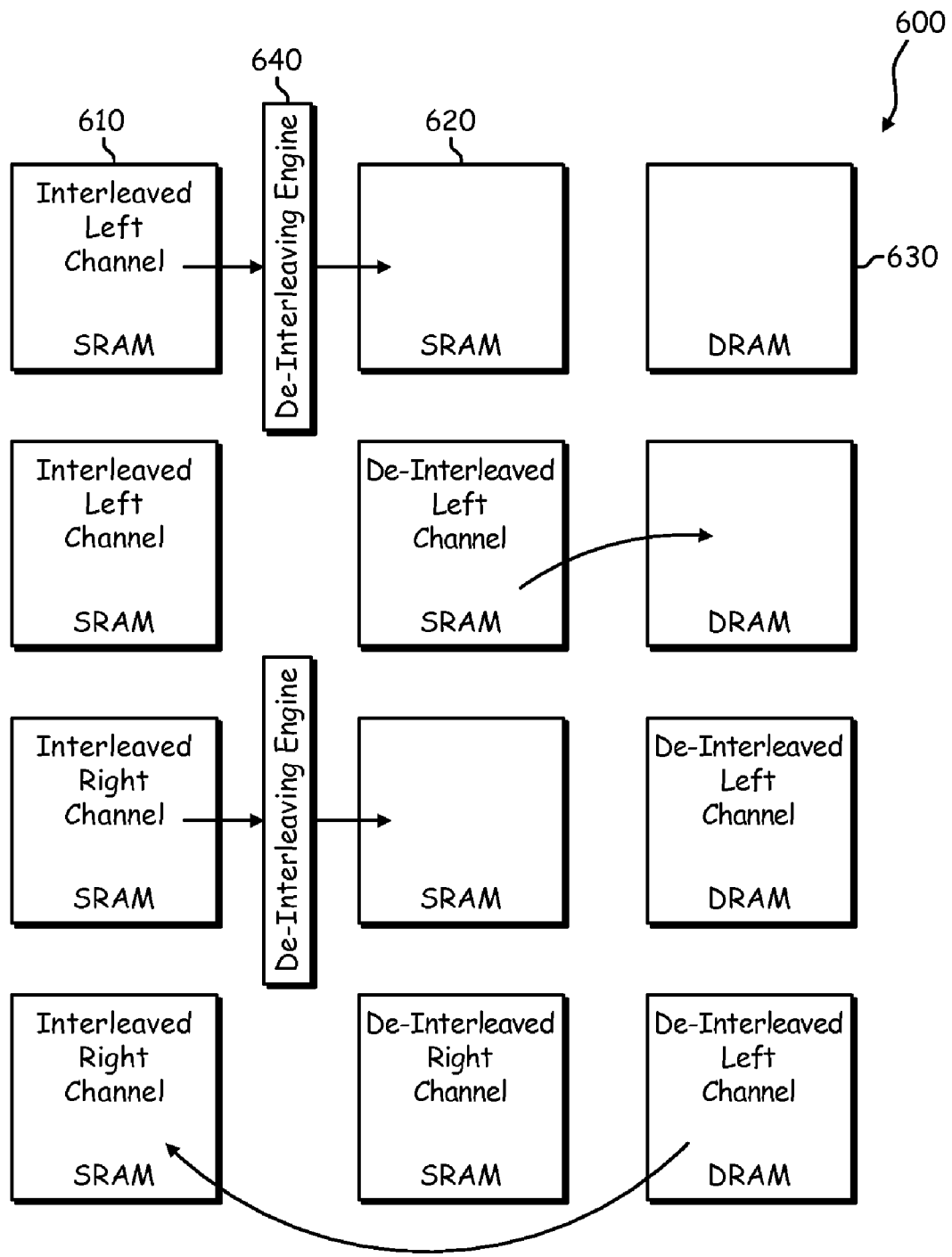
FIG. 3 is a block diagram illustrating a memory arrangement for reducing memory required to perform an audio process in accordance with an embodiment of the present invention.

Referring now to FIG. 3, there is illustrated a block diagram 600 describing the de-interleaving process using plural memory devices according to an embodiment of the present invention. The de-interleaving process may be carried out using a pair of SRAM (static random access memory devices) memory units 610,620 and a DRAM (dynamic random access memory devices) memory unit 630. The audio stream may also be configured such that the left and right audio channels may be de-interleaved separately. The de-interleaving process may be carried out after the frequency coefficients $MDCT_0 \ldots MDCT_n$ have been scaled, using the scale factors, by the quantizer step size.

Initially, a portion of an audio stream comprising interleaved left channel audio frequency coefficients may be written into a first static memory device 610. The interleaved left channel audio frequency coefficients may then be de-interleaved by a de-interleaving engine 640. The de-interleaved left channel audio frequency coefficients may be written to a second SRAM memory device 620 as they are de-interleaved.

When all of the left channel audio frequency coefficients have been de-interleaved, the first static memory device 610 contains the interleaved audio information and the second static memory device 620 contains the de-interleaved audio information.

In order to make room for de-interleaving the right channel audio frequency coefficients, the de-interleaved left channel audio frequency coefficients may be written to a DRAM dynamic memory device 630 for temporary storage. The interleaved left channel audio frequency coefficients in the first SRAM 610 are overwritten by the interleaved right channel audio frequency coefficients.

Similar to the de-interleaving of the left channel information, the interleaved right channel audio frequency coefficients may be de-interleaved by the de-interleaving engine. When the interleaved right channel audio frequency coefficients have been de-interleaved, the first SRAM 610 contains the interleaved right channel information, the second SRAM contains the de-interleaved right channel information, and the DRAM 630 dynamic memory device contains the left channel de-interleaved information.

The DRAM dynamic memory device 630, while appropriate for temporary information storage may not be appropriate for further audio decoding processes, whereas the static memory devices 610, 620 may be better suited to continued audio decoding processes. The de-interleaved left channel audio frequency coefficients may therefore be sent from the DRAM dynamic memory device 630 to the first SRAM static memory device 610, i.e., the interleaved right channel audio frequency information in the first SRAM static memory device 610 is overwritten by the de-interleaved left channel audio frequency information.

Figure 4:
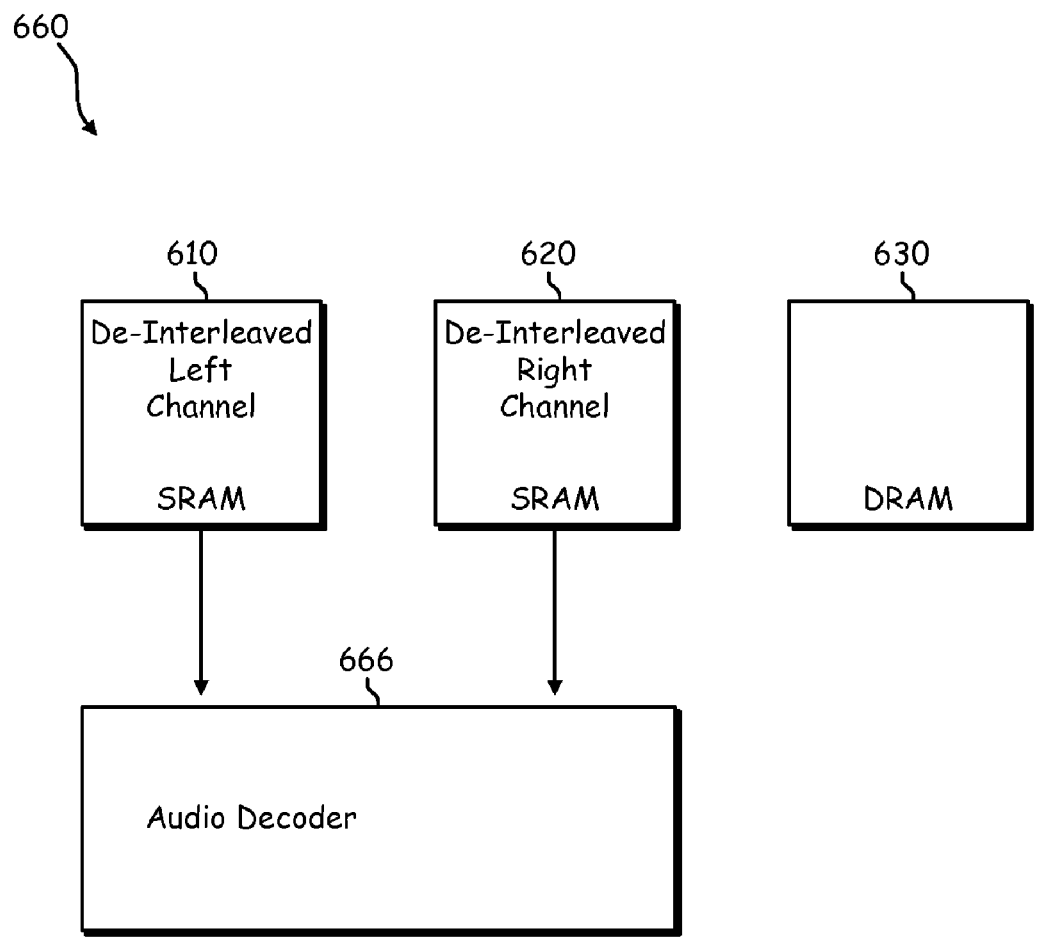
FIG. 4 is a block diagram illustrating a memory and audio decoder arrangement according to an embodiment of the present invention.

Referring now to FIG. 4, there is illustrated a block diagram 660 describing a memory arrangement for decoding de-interleaved audio frequency information. In FIG. 4, the first and second static memory devices 610, 620 may contain the de-interleaved left and right channel audio frequency information, respectively, and the dynamic memory device 630 may contain no information.

The de-interleaved right and left channel audio frequency information pass through the decoding stages such as M/S decoding, Intensity coupling decoding, TNS, and filter bank, individually, generating the final PCM samples for the left and right channels respectively in audio decoder 666.

Figure 5:
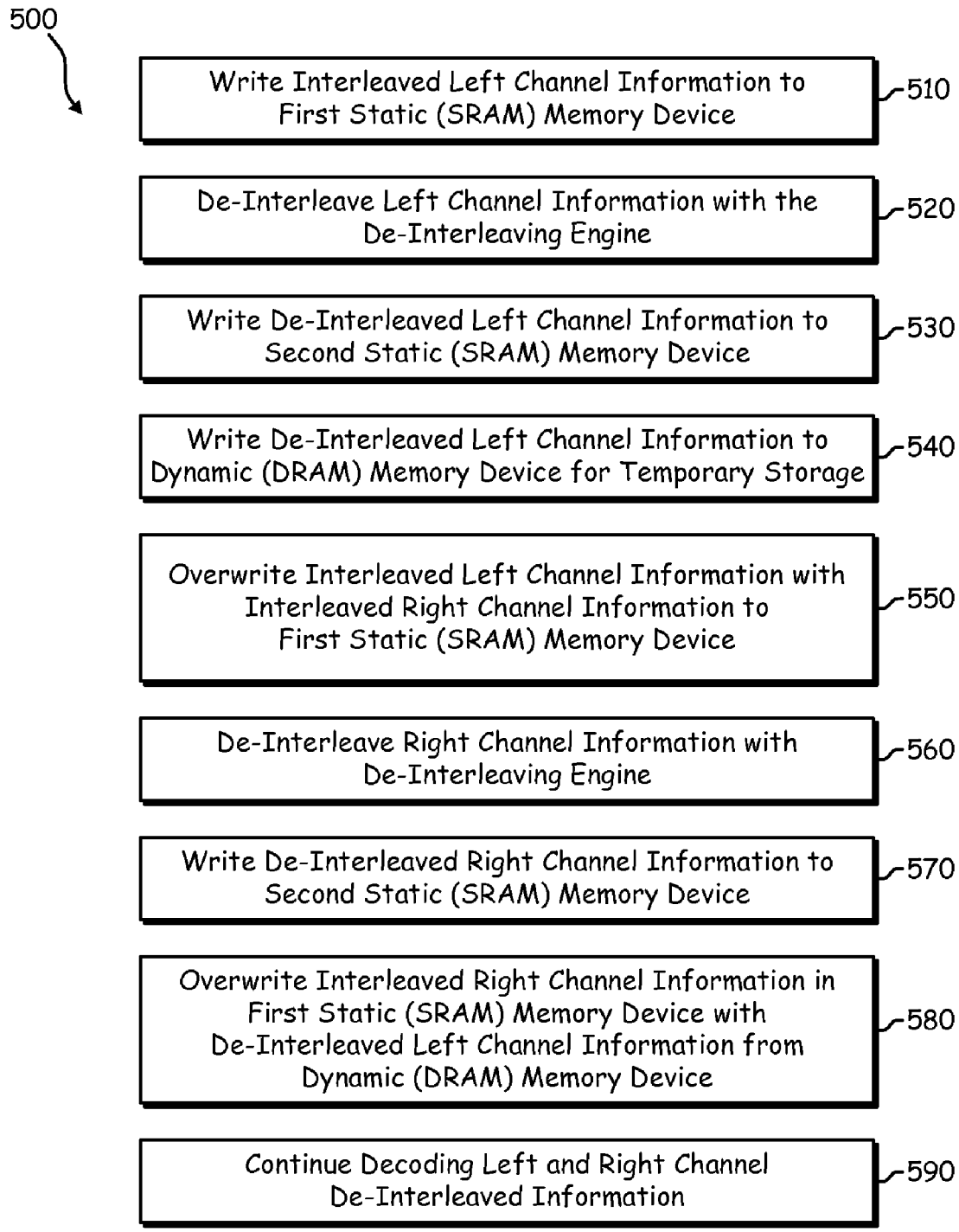
FIG. 5 is a flow diagram illustrating a method for processing a multi-channel audio signal in accordance with an embodiment of the present invention.

Referring now to FIG. 5, there is illustrated a flow diagram 500 for a method of de-interleaving plural audio channel information using a minimum number of memory devices. In FIG. 5, in block 510, the method discloses writing interleaved left channel audio information to a first SRAM static memory device.

In block 520, the interleaved left channel audio information may be de-interleaved by a de-interleaving engine and written 530 into a second SRAM static memory device. The de-interleaved left channel information may be written 540 to a DRAM dynamic memory device for temporary storage and the interleaved left channel audio information may be overwritten in the first SRAM static memory device by the interleaved right channel audio information 550.

The interleaved right channel audio information may be de-interleaved by a de-interleaving engine 560 and the de-interleaved right channel audio information may be written to the second SRAM static memory device 570. The interleaved right channel audio information in the first static memory device may then be overwritten by the de-interleaved left channel audio information from the DRAM dynamic memory device 580. The decoding process continues while the audio transmission continues 590.

Thus, the de-interleaved left channel audio information may be contained in the first SRAM static memory device and the de-interleaved right channel audio information may be contained in the second SRAM static memory device. The de-interleaved left and right channel audio information may be further decoded into left and right channel PCM data by passing through additional decoding stages, such as, M/S decoding, Intensity coupling decoding, TNS, and filter bank, individually.

The methods and systems described herein may be implemented as a board level product, as a single chip, application specific integrated circuit (ASIC), or within varying levels of the decoder system and/or integrated with other portions of the system as separate components.

The degree of integration of the decoder system will primarily be determined by speed and cost considerations. Because of the sophisticated nature of modern processors, it is possible to utilize a commercially available processor, which may be implemented external to an ASIC implementation.

Alternatively, if the processor is available as an ASIC core or logic block, then a commercially available processor can be implemented as part of an ASIC device wherein certain operations are implemented in firmware.

While the invention has been described with reference to certain embodiments, it will be understood by those skilled in the art that various changes may be made and equivalents may be substituted without departing from the scope of the invention.

In addition, many modifications may be made to adapt a particular situation or material to the teachings of the invention without departing from its scope. Therefore, it is intended that the invention not be limited to the particular embodiment(s) disclosed, but that the invention will include all embodiments falling within the scope of the appended claims.

What is claimed is:

1. A method of reducing memory requirements by de-interleaving audio information using static and dynamic buffers, the method comprising:
    writing interleaved first audio channel information to a first static memory device;
    de-interleaving the first audio channel information;
    writing de-interleaved first audio channel information to a second static memory device;
    writing de-interleaved first audio channel information to a dynamic memory device from the second static memory device;
    overwriting interleaved first audio channel information with interleaved second audio channel information in the first static memory device;
    de-interleaving second audio channel information;
    writing de-interleaved second audio channel information to the second static memory device;
    overwriting interleaved second audio channel information in the first static memory with de-interleaved first audio channel information from the dynamic memory device; and
    decoding the first and second audio channel information.

2. The method according to claim 1, wherein the first audio channel information and the second audio channel information comprise similar audio information from adjacent sub-frames.

3. The method according to claim 2, wherein similar audio information comprises audio information corresponding to a particular range of audio frequencies.

4. The method according to claim 3, further comprising maintaining audio quality of transmitted audio information by receiving audio information in an interleaved state.

5. A system for de-interleaving audio information with static and dynamic buffers, the method comprising:
    a first static memory device;
    a de-interleaving engine;
    a second static memory device;
    a dynamic memory device;
    an audio decoder, whereby interleaved first audio channel information is written into the first static memory device, de-interleaved by the de-interleaving engine, written into the second static memory device, and temporarily stored in the dynamic memory device;
    wherein the interleaved first audio channel information is overwritten in the first static memory device by interleaved second audio channel information, the interleaved second audio channel information is de-interleaved by the de-interleaving engine, and the de-interleaved second audio channel information is written to the second static memory device; and
    wherein the interleaved second audio channel information in the first static memory device is overwritten by the de-interleaved first audio channel information from the dynamic memory device.

6. The system according to claim 5 wherein the de-interleaved first and second audio channel information is decoded by the audio decoder.

7. The system according to claim 5, wherein interleaved audio information comprises similar audio information from adjacent sub-frames being associated in adjacent sub-bands.

8. The system according to claim 5, wherein similar audio information comprises audio information corresponding to a particular range of audio frequencies.

9. The system according to claim 5, wherein audio quality of transmitted audio information is maintained by receiving audio information in an interleaved state.

10. An application specific integrated circuit for de-interleaving audio information, the circuit comprising:
    a first static memory device operatively connected to a de-interleaving engine;
    a second static memory device also operatively connected to the de-interleaving engine;
    a dynamic memory device operatively connected to the first and second static memory devices;
    an audio decoder operatively connected to the first and second static memory devices and the dynamic memory device, whereby interleaved first audio channel information is written into the first static memory device, de-interleaved by the de-interleaving engine, written into the second static memory device, and temporarily stored in the dynamic memory device;
    wherein the interleaved first audio channel information is overwritten in the first static memory device by interleaved second audio channel information, the interleaved second audio channel information is de-interleaved by the de-interleaving engine, the de-interleaved second audio channel information is written to the second static memory device; and
    wherein the interleaved second audio channel information in the first static memory device is overwritten by the de-interleaved first audio channel information from the dynamic memory device.

11. The circuit according to claim 10 wherein the de-interleaved first and second audio channel information is decoded by the audio decoder.

12. The circuit according to claim 10, wherein interleaved audio information comprises similar audio information from adjacent sub-frames being associated in adjacent sub-bands.

13. The circuit according to claim 10, wherein similar audio information comprises audio information corresponding to a particular range of audio frequencies.

14. The circuit according to claim 10, wherein audio quality of transmitted audio information is maintained by receiving audio information in an interleaved state.

* * * * *

UNITED STATES PATENT AND TRADEMARK OFFICE
CERTIFICATE OF CORRECTION

PATENT NO. : 7,657,336 B2  Page 1 of 1
APPLICATION NO. : 10/717418
DATED : February 2, 2010
INVENTOR(S) : Rao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1755 days.

Signed and Sealed this

Thirtieth Day of November, 2010

David J. Kappos
*Director of the United States Patent and Trademark Office*